July 30, 1940.   A. H. LANDRY   2,209,340
AUTOMATIC FEEDING DEVICE
Filed July 27, 1938   3 Sheets-Sheet 1

WITNESSES

INVENTOR
Adolphus H. Landry
BY
ATTORNEYS

July 30, 1940.  A. H. LANDRY  2,209,340

AUTOMATIC FEEDING DEVICE

Filed July 27, 1939  3 Sheets-Sheet 2

WITNESSES

INVENTOR
Adolphus H. Landry
BY
ATTORNEYS

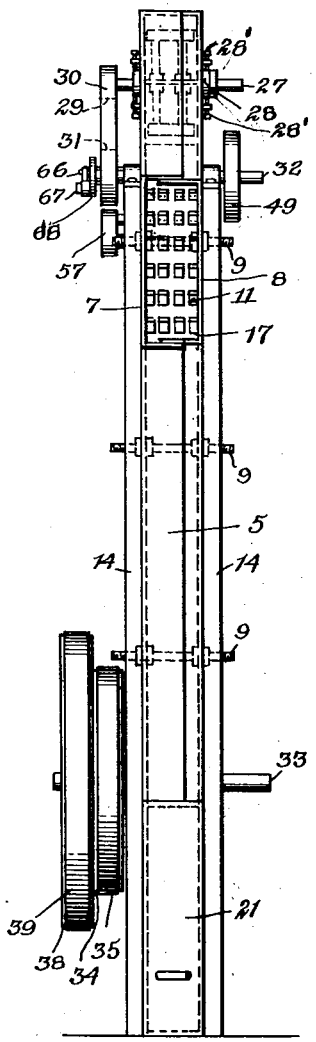
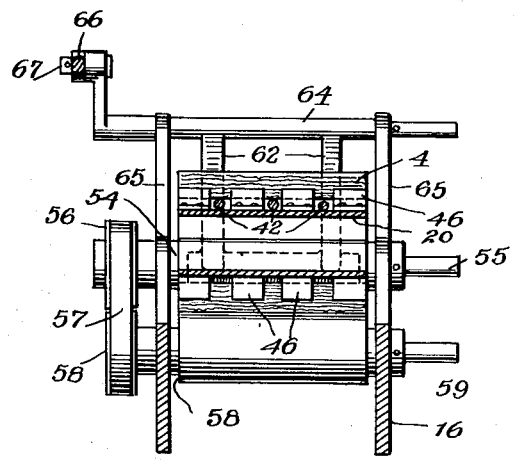
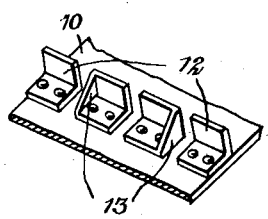

Patented July 30, 1940

2,209,340

UNITED STATES PATENT OFFICE 2,209,340

AUTOMATIC FEEDING DEVICE

Adolphus H. Landry, Skowhegan, Maine, assignor of one-half to André J. Shank, Lewiston, Maine Application July 27, 1938, Serial No. 221,519

2 Claims. (Cl. 198—53)

This invention relates to automatic feeding devices for lathes and other wood-turning machinery, and has for an object to provide a construction wherein desired pieces of wood may be correctly fed to a lathe without any chance of injury to the operator.

Another object of the invention is to provide a feed hopper and associated structures for feeding pieces of wood to a lathe with an opening in the hopper so far removed from the cutting device of the lathe that a workman placing articles of wood in the hopper cannot reach over to adjust a piece of wood on the lathe even though an adjustment is desired.

A further object, more specifically, is to provide a feed hopper for a lathe or other wood-turning device which will arrange pieces of wood in the desired order and then feed the same at spaced intervals to the lathe without requiring workmen to go over the lathe.

In the accompanying drawings—

Fig. 4 is a front view of the structure shown in Fig. 1;

Fig. 5 is an enlarged sectional view through Fig. 1 approximately on the line 5—5;

Fig. 6 is an enlarged detail perspective view of a small section of the elevating carrier shown in Fig. 1.

Referring to the accompanying drawings by numerals, 1 indicates the centers of a lathe or other wood-turning device, and 2 a guide for guiding blocks of wood to the centers 1. The members 1 and 2 just described form part of the lathe, which is no part of the present invention except that the present invention feeds blocks of wood to the lathe at spaced intervals whereby the blocks may be turned to the desired size and shape. It will be noted that the feed belt 3 carries the blocks in spaced relation and properly arranged at right angles to the travel of the belt so that the blocks may be successively and at timed intervals discharged on to the guide 2.

Figure 1:
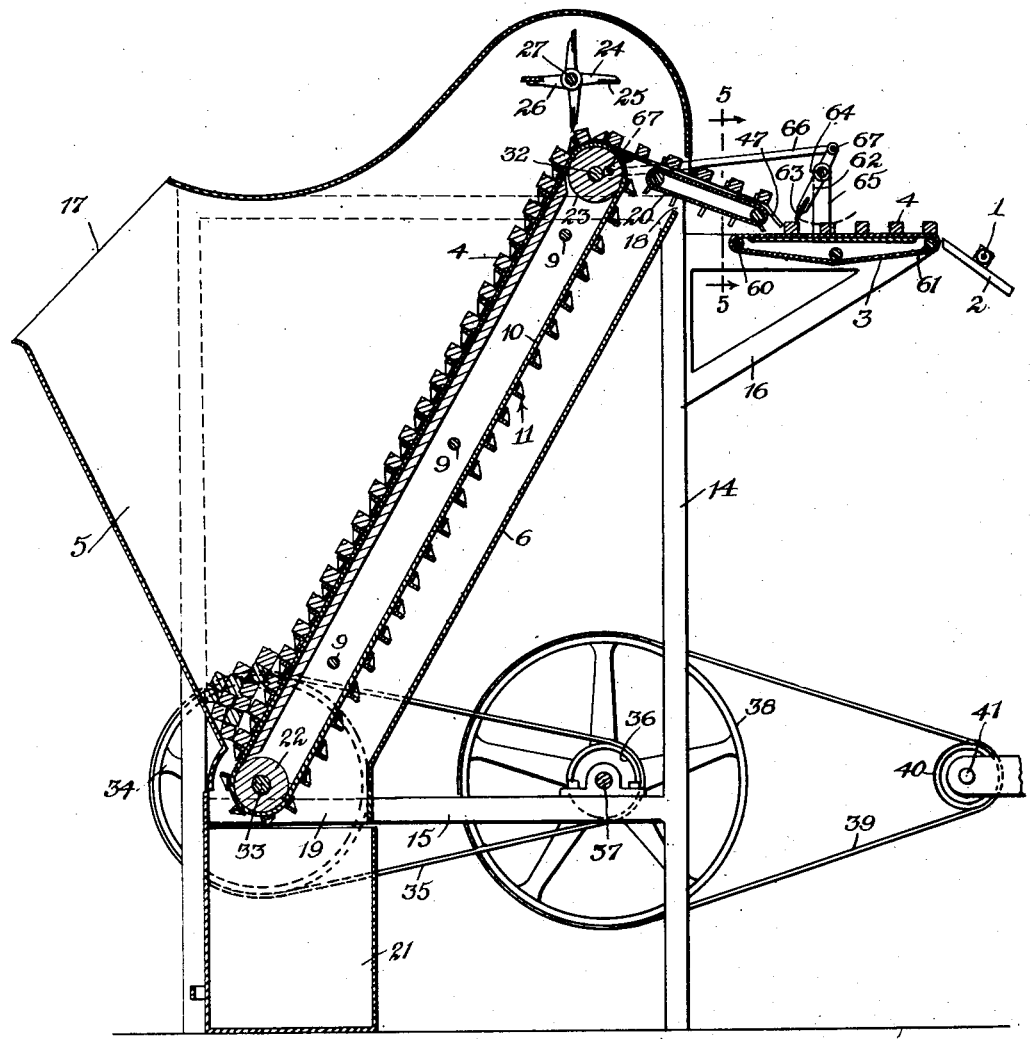
Fig. 1 is a longitudinal vertical sectional view through a feed device disclosing an embodiment of the invention.

In order that the various blocks of wood 4 may be thus moved and arranged there are provided a hopper 5 and various other parts hereinafter fully described for securing this result. The hopper 5 is provided with a bottom plate 6 and with a pair of side members 7 and 8 which are held in place by suitable bolts 9. As shown particularly in Fig. 4, the front of the hopper is formed from overlapping flanges extending from the side plates, whereby the side plates may take care of different widths of belt 10, which with associated structures forms a carrier 11, as shown in Fig. 1. This carrier consists of belt 10 and spaced rows of brackets 12. Some of the brackets are provided with inclined side members 13 whereby when any block of wood 4 enters between two rows of brackets it will slide downwardly into correct position. Preferably the bottom of plate 6 is also overlapped similar to the front, as shown in Fig. 4. The respective side members 7 and 8 are bolted, welded, riveted, or otherwise rigidly secured to a metal frame 14 of any desired structure and provided with suitable braces 15. A pair of metal brackets 16 are welded or otherwise rigidly secured to the frame 14 so as to support certain parts hereinafter described.

As illustrated in Fig. 1, the hopper 5 is completely closed except for the inlet opening 17 through which blocks 4 are inserted by workmen and also except for the openings 18 and 19. Opening 18 is adapted to accommodate the belt 20 while opening 19 is adapted to permit sawdust and small foreign matter to drop down into a drawer or container 21 so that it may be removed from time to time. A workman may throw in by hand blocks of wood 4 through opening 17, or blocks of wood may be directed therein by a chute, and these blocks will automatically fall to the lowest point of the hopper so as to form a pile of blocks.

As the carrier 11 functions and belt 10 moves over the respective pulleys 22 and 23, the rows of brackets 12 will successively engage and carry upwardly blocks of wood 4. Usually the blocks 4 automatically arrange themselves properly on the respective brackets but occasionally a block will be incorrectly arranged or possibly two blocks may be carried up by one row of brackets and when this occurs the four-bladed member 24 will strike the protruding block and knock the same off. The block thus removed falls to the bottom of the hopper and may be brought up a little later as the carrier functions. The member 24 is provided with four blades 25, though a greater or less number might be used without departing from the spirit of the invention. These blades are secured to suitable radially extending arms 26 which are mounted on a shaft 27 rotatably mounted in journal members 28 carried by the hopper 5. The member 24 is adjustable vertically or in a direction toward or from shaft 32 so as to maintain the belt 30 tight and also to vary the space between the zone of movement of the blades 25 and the blocks 4 as they pass pulley 23. This adjustment is shown particularly in Figs. 2 and 4, from which it will be seen that the shaft 27 has enlarged bearing members against which suitable set screws 28' brace, said set screws being carried by brackets secured to the side plates 7 and 8. A pulley wheel 29 is connected to shaft 27 and this shaft is rigidly connected to arm 26 so that as the belt 30 rotates the pulley 29 member 24 will be rotated. The rotation of member 24 continues as long as the device is in use as belt 30 passes over a pulley 31 rigidly secured to the shaft 32 to which the pulley 23 is rigidly secured. Pulley 23 is driven by the belt 10 and this belt in turn is driven by the pulley 22 which is rigidly secured to axle 33, which axle has a comparatively large pulley wheel 34 rigidly secured thereto. A belt 35 is fitted on to the pulley 34 and on to a small pulley 36 so that as small pulley 36 is rotated it will rotate the large pulley 34. A shaft 37 is rigidly secured to the small pulley 36 and to a second large pulley 38 which is driven by a belt 39. Belt 39 is driven by a pulley 40 which in turn is driven by a shaft 41, which shaft is driven by an electric motor or other power element. Usually the shaft 41 is connected to the same power that operates the lathe though this is not essential. The shaft 37 is supported by suitable journal members carried by the cross braces or rods 15.

Figures 2, 3:
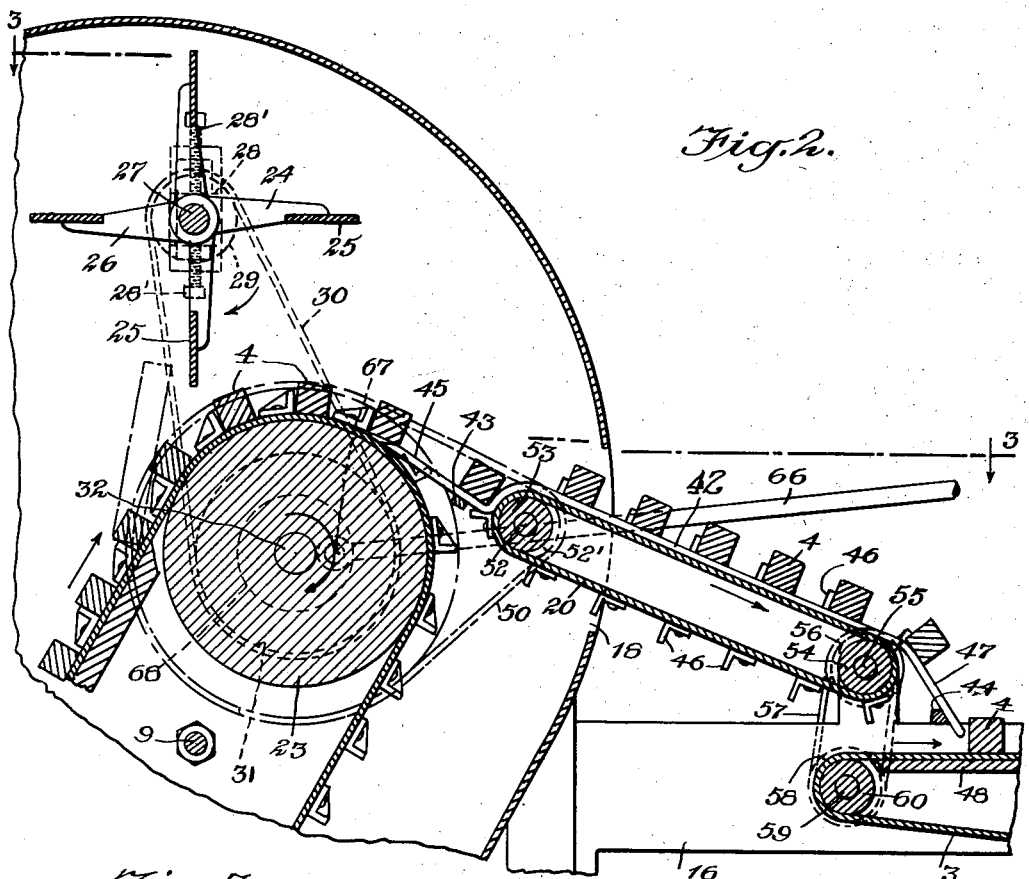
Fig. 2 is an enlarged sectional view of the upper part of the structure shown in Fig. 1.
Fig. 3 is a sectional view through Fig. 2 approximately on the line 3—3.

By this arrangement of pulleys and belts the comparatively high speed of shaft 41 is appreciably reduced so that the carrier 11 will move rather slowly and as it gathers up the blocks of wood 4 it automatically separates the same somewhat and then discharges the blocks on to a wire grille 42, as more clearly shown in Figs. 2 and 3. This grille is supported by suitable stationary supports 43 and 44 and is arranged very close to the upper run of the belt 20. The upper end of this grille has a screen 45 extending to a position almost in contact with the belt 10 so as to receive the blocks 4 from the belt. It will be observed that the various brackets 12 are spaced apart and the individual members of the grille 42, which grille is preferably made of wire as above stated, are positioned so that the brackets 46 will pass on the respective side of the members. It will be noted that as the blocks 4 leave the belt 10 they will move downwardly under the action of gravity over the extension 45 and then be engaged by one of the brackets 46 and move upwardly and then along over the upper surface of the grill 42 as brackets 46 move between the respective members of the grill. Preferably the brackets 46 are spaced apart a somewhat greater distance than the rows of brackets 12 so that the blocks 4 will be spaced farther apart than when they are on the carrier 11. The grill 42 has a discharge section 47 down which the blocks 4 slide and strike the feed belt 3 which has the upper run supported by a plate 48 welded or otherwise rigidly secured to the brackets 16. As the belt 3 moves the blocks successively fall off the end of the belt and slide downwardly on the guide 2 under the action of gravity.

It will therefore be seen that the blocks are taken from a pile, separated to a certain etxent and spaced somewhat apart. As the blocks move on to the belt 3 they are further separated so that at desired spaced intervals the blocks are fed to the lathe or other wood-turning machine.

A pulley 49 is rigidly secured to shaft 32 and accommodates a belt 50 which passes over a pulley 51 which is rigidly secured to shaft 52. Shaft 52 is rigidly secured to a roller 53 and this roller acts as a drive roller for the belt 20. Belt 20 drives the roller 54, which is rigidly secured to a shaft 55, and this shaft drives a pulley 56 which is rigidly secured thereto. The belt 57 is fitted onto pulley 56 and also onto a pulley 58, whereby as the belt functions pulley 58 will be rotated and in turn will rotate a shaft 59 to which it is rigidly secured. A pulley 60 is rigidly secured to shaft 59 and drives the belt 3, which belt passes over a second pulley 61, which is an idler.

As the blocks 4 move on to the belt 3 sometimes they will move to an incorrect position and lie one on the other, or be improperly spaced apart but extend in a direction diagonally across the belt. An oscillating arm 62 provided with a brush 63 acts to move the blocks to a position extending transversely of the belt. Arm 62 is pivotally mounted at 64 in a pair of brackets 65 upstanding from bracket 16. A link 66 is pivotally connected at 67 to arm 62 and is connected by a suitable wrist pin 67' to a disk 68 rigidly secured to shaft 32. As shown in Fig. 5 there are two arms 62 and the brush 63 extends for the full width of the belt 3.

By providing mechanism as just described blocks of wood of the desired length are arranged in parallelism and eventually discharge so as to be readily engaged by the centers 1 of the lathe. The lathe quickly cuts the block into the desired shape and then releases the same so as to accommodate the next block. It will be understood, of course, that the action of the lathe must be timed with the action of the feed device. If for any reason one of the blocks should be knocked off or missing on the belt 3, this would cause no injury to any of the parts but would merely reduce the number of blocks operated on. If a block were carried up and discharged on to the belt 3, which block was too large, the brush 63 would engage the same and move the block in one direction or the other so that a workman would see that an undesirable sized block had been fed into the device and would take the desired action, namely, remove the undesired sized block.

When the hopper is constricted or enlarged by causing the parts to overlap more or less so as to accommodate different lengths of blocks, it will be necessary to change the belt 10 to the desired adjustment of the size of the hopper. Preferably the belt 10 is almost as wide as the interior of the hopper.

I claim:

1. An automatic feed comprising a hopper, an endless carrier arranged in said hopper formed with a plurality of rows of brackets arranged transversely of the hopper and adapted to engage and raise blocks of wood, a grille adapted to receive said blocks of wood from the highest point on said carrier and direct the same under gravity to a given point without deranging their transverse position, a transfer belt having spaced brackets thereon for moving said blocks of wood without deranging their transverse position along said grille and to a discharge point, said brackets being adapted to extend through the grille when moving blocks along the grille, and a feed belt for receiving said blocks of wood for feeding the blocks of wood in spaced relation without deranging their transverse position to a discharge point.

2. An automatic feed for feeding blocks of wood of a given length to a lathe or other woodturning device, including a hopper adapted to receive blocks of wood, a carrier for raising said blocks of wood to a high point and then discharging the same, said carrier including an endless belt and a plurality of spaced rows of brackets, certain of said brackets having inclined rear walls for causing the blocks of wood picked up by the belt to be arranged on the belt so as to extend in a straight line transversely of the belt, means for knocking off the belt blocks of wood at said high point which are out of correct position, and means for receiving and directing blocks of wood without deranging their transverse position from said high point so that the blocks of wood will be discharged at successive intervals to said lathe.

ADOLPHUS H. LANDRY.